(12) United States Patent
Schmid

(10) Patent No.: US 7,620,518 B2
(45) Date of Patent: Nov. 17, 2009

(54) DISTANCE MEASURING DEVICE AN METHOD FOR TESTING THE OPERATION OF A DISTANCE MEASURING SYSTEM

(75) Inventor: Roland Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/883,967

(22) PCT Filed: Feb. 24, 2006

(86) PCT No.: PCT/EP2006/060273

§ 371 (c)(1),
(2), (4) Date: Apr. 24, 2008

(87) PCT Pub. No.: WO2006/092384

PCT Pub. Date: Sep. 8, 2006

(65) Prior Publication Data

US 2008/0266052 A1    Oct. 30, 2008

(30) Foreign Application Priority Data

Mar. 3, 2005  (DE) .................. 10 2005 009 702

(51) Int. Cl.
*G01B 5/02* (2006.01)
*G01S 13/00* (2006.01)
(52) U.S. Cl. .................. 702/158; 342/70; 342/189
(58) Field of Classification Search .................. 702/127, 702/149, 158, 159, 189; 701/35; 340/5.1, 340/435, 686.6; 342/27, 70, 73, 200
See application file for complete search history.

(56) References Cited

U.S. PATENT DOCUMENTS

| | | | | |
|---|---|---|---|---|
| 5,471,215 | A * | 11/1995 | Fukuhara et al. | 342/70 |
| 5,987,395 | A * | 11/1999 | Donges | 702/158 |
| 6,765,491 | B1 | 7/2004 | Nass | |
| 2004/0051659 | A1 | 3/2004 | Garrison | |
| 2008/0258964 | A1* | 10/2008 | Schoeberl et al. | 342/189 |

FOREIGN PATENT DOCUMENTS

| | | |
|---|---|---|
| DE | 199 24 755 | 11/2000 |
| GB | 2 309 555 | 7/1997 |
| WO | WO 03/003122 | 1/2003 |

\* cited by examiner

*Primary Examiner*—John H Le
(74) *Attorney, Agent, or Firm*—Kenyon & Kenyon LLP

(57) ABSTRACT

A distance measuring device for measuring a distance of a vehicle to an obstacle and a method for testing the operation of a distance measuring system. Two measuring systems are provided, each operating according to a different measuring method. Reliable operation of the second measuring system is established when the second measuring system detects an obstacle which has already been detected by the first measuring system.

10 Claims, 2 Drawing Sheets

DISTANCE MEASURING DEVICE AN METHOD FOR TESTING THE OPERATION OF A DISTANCE MEASURING SYSTEM

BACKGROUND INFORMATION

Distance measuring devices for motor vehicles which use ultrasonic signals to determine the distance to obstacles in the surroundings of the vehicle are known. An ultrasonic signal is emitted by a sensor, and the signal is reflected by an obstacle. The reflected signal is received again by the sensor that emitted it, or possibly also by another sensor. The distance of the obstacle to the vehicle is determined from the propagation time of the signal. Ultrasonic distance measuring devices of this type are used mostly for supporting the driver in parking the vehicle. These devices make use of the fact that the entire surroundings of the vehicle, but at least a wider angular range in front of and/or behind the vehicle, may be covered using relatively few sensors. In general, however, the range of ultrasonic sensors is limited. For other applications, for example, for adaptive cruise control (ACC), radar sensors are used, in which radar signals are emitted, reflected by an obstacle, and received again by the radar sensor. The distance to the obstacle is determined from the signal change due to the propagation time. Radar sensors of this type are characterized in that they have a relatively long range of up to 200 m. On the other hand, for monitoring traffic, the monitored angular range should not be so great that obstacles on the sidewalk or on a parallel street are perceived as a vehicle traveling ahead. To implement the different applications such as parking assistance and adaptive cruise control in a vehicle, providing both ultrasonic sensors and radar sensors for the different applications in a vehicle is known.

Furthermore, performing a self-test for the particular systems is also known. In particular in the case of ultrasonic sensors, contamination may also result in a possibly gradual drop in performance. If this drop in performance is not detected, the system may go entirely blind. If the ultrasonic sensors belonging to a system are contaminated to different degrees, a blindness detection procedure known from German Patent Application No. DE 199 24 755 may be performed by analyzing the direct crosstalk of sensors. Here it is checked whether, when a signal is emitted which is transmitted to another sensor via crosstalk by the bumper, a reflected signal from an obstacle is also received. However, if all sensors are contaminated in the same way, a drop in performance may possibly not be detected.

SUMMARY OF THE INVENTION

The distance measuring device according to the present invention and the method for testing the operation of a distance measuring system according to the present invention have the advantage over the related art that a distance measuring system which is operated using a second measuring method is tested using a distance measuring system which is operated using a first measuring method. Different measuring methods are to be understood here as different physical principles using which a distance measurement is performed. Thus, for example, acoustic distance measurement, e.g., ultrasonic distance measurement, and electromagnetic distance measurement, e.g., radar distance measurement or infrared light distance measurement (LIDAR), are based on different physical principles. In that case, in one instance the propagation and propagation time of sound waves and in one instance the propagation time of electromagnetic waves are used for a measurement. Should one measuring method be impaired, this will not generally impact the other measuring method. For example, in the event of an electromagnetic interference, the propagation of sound waves does not need to be affected. If, on the contrary, ultrasonic sensors are contaminated, such a contamination, if it also occurs at all in front of a radar sensor, will only negligibly impair the propagation of radar beams or will not impair the propagation at all. In contrast to a pure self-test, monitoring of the second measuring system by the first measuring system, which operates according to a different measuring method, ensures a high degree of reliability of the measured results. Reliable and virtually interference-free information may thus be obtained about the operation of a measuring system in the vehicle.

It is particularly advantageous that the first measuring system is designed as a measuring system having a long range and the second measuring system as a measuring system having a short range and a maximum possible angular coverage. While the long-range measuring system may cover a remote area on the road in front of the vehicle, the measuring system having wide angular coverage is used in particular for covering, if possible, the entire surroundings of the vehicle, at least in an area in front of the vehicle or behind the vehicle in the direction of travel, so that possibly no blind spot exists in the direction of travel. If there is an obstacle directly in front of the vehicle at a distance that may be monitored by both measuring systems, both systems are in a position to detect the obstacle. An overlapping area of coverage by both systems thus exists in the close range. In such a case, the systems may mutually test the operation of one another. In particular, the short-range system may be tested if the long-range system detects an obstacle in the closer surroundings of the vehicle within the range of the short-range system. If such an obstacle exists and is detected by the long-range system, the short-range system must also be able to detect this obstacle in the close range. It is advantageous in particular if the short-range system is designed as an ultrasonic distance measuring device and the long-range system is designed as a radar distance measuring device or infrared distance measuring device.

It is furthermore advantageous if the operating test is performed shortly before starting the vehicle to ensure that both systems are operational at start. Obstacles such as pedestrians are thus reliably detected by a distance measuring device and the driver may be warned about such an obstacle. In particular if there is a long-range measuring system, this system is primarily intended for detecting obstacles at a longer distance of 10 m to 200 m, for example. In the close range, for example, between 1 m and 10 m, distance measurement is also possible, but the entire area in front of the vehicle cannot be detected due to a possibly reduced angular coverage. If there is an obstacle in this close range in front of the vehicle, this obstacle may not be detected by the long-range measuring system. However, the short-range measuring system is able to detect this obstacle. Such a warning may, however, be output by the short-range measuring system with a high degree of reliability only if its operation has been tested. For example, if snow or sleet has deposited on the short-range measuring system during travel, the measurement may be impaired, in particular if sound signals are used for the measurement. The obstacle in front of the vehicle would then be seen neither by the long-range system nor by the short-range system. However, if an obstacle in front of the vehicle is within a distance that allows obstacle detection for both the long-range and short-range systems, both systems must detect the obstacle. An operating test advantageously takes place in that, in the event where the long-range measuring system detects the obstacle, an attempt is made to also measure the distance to the obstacle using the short-range measuring system. If in this case the short-range measuring system also detects the obstacle, the operation of the short-range measuring system is ensured. If it does not detect the obstacle, obstacle monitoring in the area in front of the vehicle may not be reliably performed prior to start. A particularly reliable operating test of the short-range system may be advantageously performed if the long-range system has detected an obstacle stopping in front of it, because obstacle detection is particularly reliable in the case of moving objects due to the design of the system.

It is advantageous in particular if the monitoring measurement is performed shortly before the vehicle starts moving again. An intent to start moving may be detected, for example, by a gear having been engaged or selected, the brake having been released, or the gas pedal having been touched. This ensures that when the vehicle subsequently starts moving, the travel area in front of the vehicle is being effectively monitored and the driver may be warned about an obstacle if necessary.

It is furthermore advantageous if an appropriate measurement is provided in a vehicle, which automatically resumes travel after stopping only if the vehicle traveling ahead also starts moving again. In that case, if the vehicle is stopped, pedestrians may use the opportunity to cross the street, for example, and be in the time period between the front vehicle and the host vehicle when the front vehicle starts moving. If no reliable obstacle detection takes place, the host vehicle may start and put the pedestrian that is between the moving front vehicle and the following host vehicle at risk. However, in the event of reliable obstacle detection this risk may be ruled out.

DETAILED DESCRIPTION

The present invention may be used for any desired distance measuring device that has at least two measuring systems operating by different measuring methods. The physical principles by which the measuring systems operate should be different. One measuring system may be an ultrasonic distance measuring system, for example. Another measuring system may be an infrared system which has two or more wide-angle sensors. A video distance measuring system having a camera analyzer, a LIDAR distance measuring system, a radar distance measuring system, or an acoustic distance measuring system may also be used as different measuring methods. It is advantageous, for example, if at least one ultrasonic distance measuring system and one radar distance measuring system are integrated in a distance measuring device of a vehicle. Therefore, the present invention is elucidated in the following on the basis of the example of such a distance measuring device.

Figure 1:
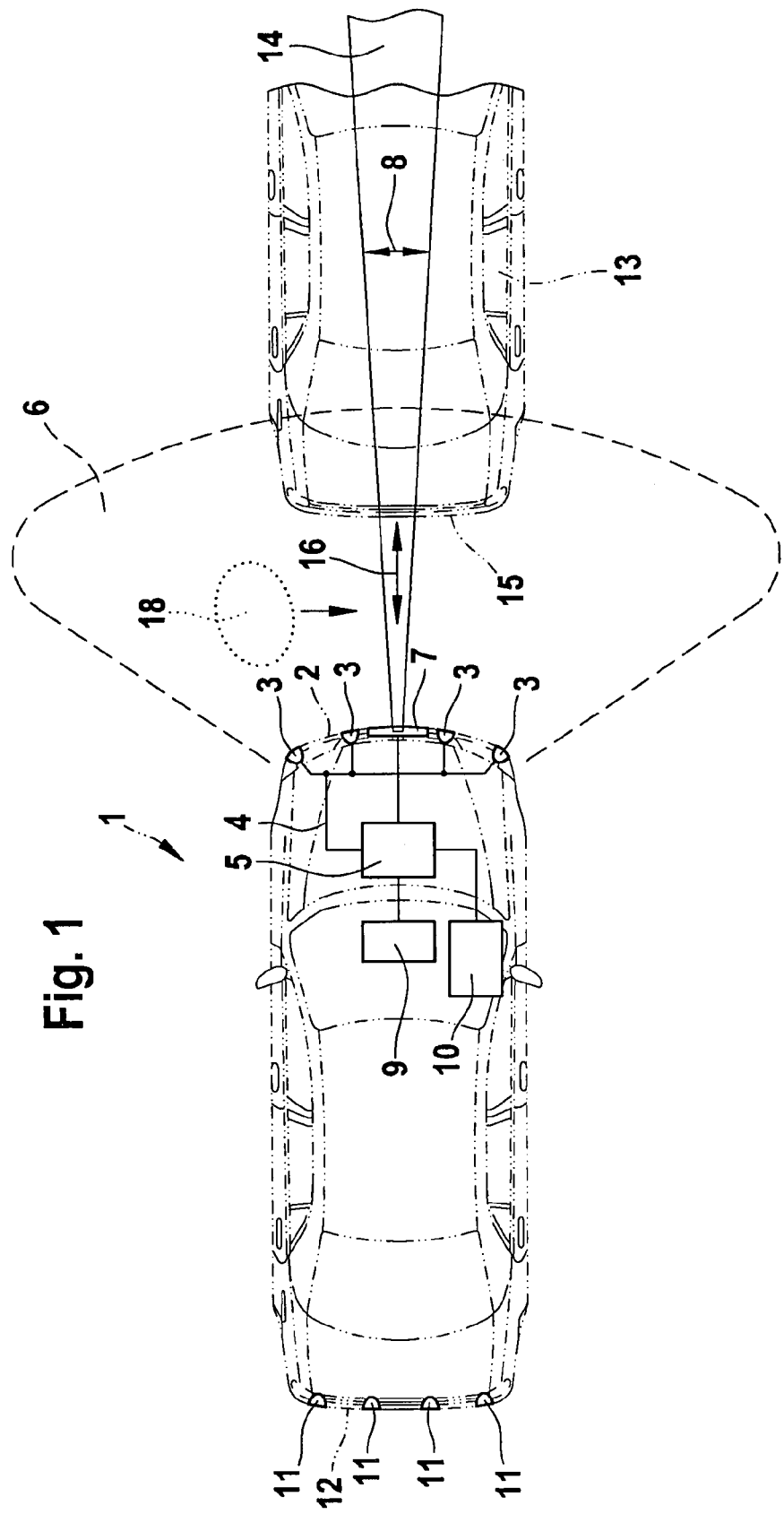
FIG. 1 shows a schematic top view onto a vehicle having a distance measuring device according to the present invention and a vehicle traveling ahead of the vehicle.

A vehicle 1 having a distance measuring device according to the present invention is illustrated in FIG. 1. The distance measuring device has four ultrasonic sensors 3 on a vehicle front 2, which are connected via a data bus 4 to an analyzer device 5 in the vehicle. Ultrasonic sensors 3 are controlled by analyzer device 5 and emit ultrasound waves into the area in front of the vehicle. These ultrasound waves are reflected by obstacles in a detection range 6 of the sensors. Detection range 6 is shown as a shaded area in FIG. 1. It results from an overlapping of the individual sound lobes emitted by the particular sensors. In the exemplary embodiment shown here, the ultrasonic sensors have a range of approximately 6 m and cover an approximately semicircular area in front of the vehicle. Even targets that are not immediately in, but may move into, the travel path of the vehicle may thus be detected. In other specific embodiments more or fewer sensors may also be used. The ranges of the sensors may also vary.

Analyzer unit 5 is also connected to a radar sensor 7, which emits a radar signal in a signal cone, preferably in a beam angle 8 of approximately 7° to 15°. Signal cone 14 makes it possible to detect obstacles in the area of signal cone 14 up to a distance of approximately 80 m. If necessary, other ranges and detection angles may also be implemented. Analyzer unit 5 processes the data, received by ultrasonic sensors 3 and radar sensor 7, of the distance to the obstacles in the vehicle's surroundings. In a specific embodiment not shown in FIG. 1, individual analyzer units may also be provided for analyzing the data of ultrasonic sensors 3 and radar sensor 7. In a preferred specific embodiment, analyzer unit 5 is connected to an output unit 9, which warns the driver about obstacles in his travel path or in the surroundings of the vehicle. Acoustic and/or visual warnings may be output to the driver via suitable output means. Furthermore, in a preferred specific embodiment, analyzer unit 5 is connected to a drive train control unit 10. The vehicle may be decelerated by automatic brake intervention via drive train control unit 10, but in another preferred specific embodiment it may also be accelerated by an automatic acceleration system according to the information provided by analyzer unit 5.

In a first mode of operation, radar sensor 7, cooperating with analyzer unit 5 and drive train control unit 10, is used for adapting the velocity of vehicle 1 to a velocity of a vehicle traveling ahead. For this purpose, the distance to the vehicle traveling ahead is measured. The velocity of vehicle 1 is regulated in such a way that a suitably specified distance to the vehicle traveling ahead is set according to a distance formula specified by analyzer unit 5. To hold this distance, the vehicle is either automatically accelerated or automatically braked.

Ultrasonic sensors 3 are used in particular for monitoring the surroundings of the vehicle when parking in a parking space and to warn the driver of an imminent collision with an obstacle. In a preferred specific embodiment, the vehicle may also be automatically braked before an imminent collision with an obstacle. Because the driver must often back into a parking space, ultrasonic sensors 11 are situated on a rear 12 of the vehicle and are activated when backing up to monitor the rearward driving space.

In the situation depicted in FIG. 1, a vehicle 13 traveling ahead of vehicle 1 has stopped, for example, when approaching an intersection, because of a red light, or due to a traffic jam. Signal cone 14 of radar sensor 7 impinges on rear 15 of the other vehicle 13 and is reflected therefrom, as indicated by double arrow 16. If the other vehicle 13 remains stopped, in a preferred specific embodiment vehicle 1 behind it also stops, maintaining a predefined minimum distance. A typical distance between vehicle 1 and another vehicle traveling ahead is between 2.5 m and 4 m. If no automatic stopping is provided, the driver himself stops vehicle 1 at a comparable distance.

If vehicles 1 and 13 are now at a very short distance from one another, vehicle 13 is also in detection range 6 of ultrasonic sensors 3. Wheel speed sensors, for example, ascertain that vehicle 1 is stopped. If it is established that vehicle 1 is stopped and the radar sensor reports that other vehicle 13 is within a specified distance of 6 m, for example, ahead of vehicle 1, an operating test of ultrasonic sensors 3 is started. The operating test in this case tests whether ultrasonic sensors 3 also detect other vehicle 13.

If the other vehicle is detected by ultrasonic sensors 3, the operating test is terminated with a positive result and proper operation of ultrasonic sensors 3 is established. In addition to radar sensor 7, the measuring system having ultrasonic sensors 3 is now also activated for further measurements. These may monitor detection area 6 via direct echo measurements and/or cross echo measurements. If other vehicle 13 starts moving again, an increase in the distance to other vehicle 13 is detected by radar sensor 7. Before vehicle 1 is accelerated, in particular automatically, ultrasonic sensors 3 check whether another obstacle is detected in detection area 6. Such an obstacle may be a bicycle or a pedestrian 18, for example, which has moved into the area between vehicles 1, 13 during the period in which vehicles 1, 13 were stopped. If an obstacle is detected in detection area 6, the vehicle is prevented from starting moving, in particular from starting moving automatically. If no obstacle is detected in detection area 6, the vehicle starts moving automatically to follow the vehicle traveling ahead at a suitable distance. In a further specific embodiment, the vehicle starts moving even if an obstacle is detected in detection area 6, but this obstacle is not in a travel path of vehicle 1 in front of vehicle 1. When a minimum velocity of, for example, 20 km/h is reached, ultrasonic sensors 3 are deactivated, while radar sensor 7 remains activated for following the movement of the other vehicle 13 traveling ahead.

The operating test may ensure that obstacles 18 which move into detection area 6 of the ultrasonic sensors are reliably detected. In the case when the other vehicle has been detected by the radar sensor but is not detected by ultrasonic sensors 3 during the operating test of ultrasonic sensors 3, the operating test is concluded with a negative result. The vehicle does not start moving automatically in either case. A visual, acoustic, or haptic warning or a combination of such warnings is preferably output to the driver for this purpose.

Figure 2:
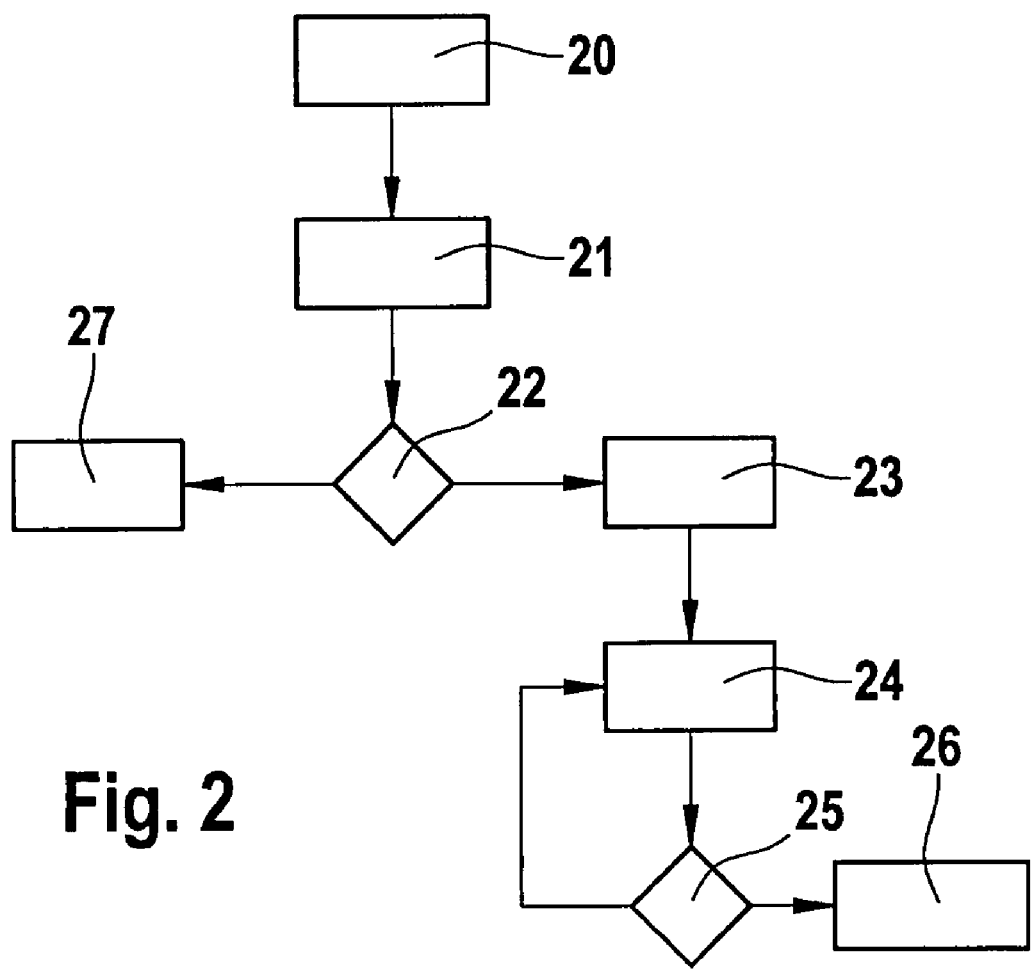
FIG. 2 shows a sequence of the method according to the present invention for testing the operation of a distance measuring system and for the use of a distance measuring device according to the present invention.

FIG. 2 shows a sequence of the operating test method according to the present invention when using the distance measuring device according to the present invention. If vehicle 1 has stopped behind another vehicle 13, the operating test method according to the present invention is initiated with an initialization step 20. In a subsequent measuring step 21, the ultrasonic sensors measure the distance to obstacles in front of vehicle 1. In a further subsequent first testing step 22, a check is made of whether ultrasonic sensors 3 are detecting other vehicle 13 stopped in front of vehicle 1. If this is not the case, the ultrasonic measuring system is not ready to perform monitoring of the area in front of the vehicle. An appropriate error message is output to the driver via output unit 9 in an output step 27. The vehicle does not start moving, possibly automatically, later. However, if other vehicle 13 stopped in front of vehicle 1 is detected, proper operation of ultrasonic sensors 3 is determined in a determination step 23. In a subsequent measuring step 24, the ultrasonic sensors monitor the area in front of the vehicle in their detection range 6, preferably together with radar sensor 7. In a second testing step 25, a check is made of whether there is another obstacle in the area in front of the vehicle. If this is the case, the method branches back to measuring step 24 and the measurement is repeated. If no other obstacle is detected, the method branches to an acceleration step 26 in which the vehicle is accelerated again to set a predefined distance to other vehicle 13 traveling ahead.

In a further specific embodiment, instead of automatic acceleration step 26, acceleration may also be triggered by the driver, for example, by operating an operator's control element on the steering wheel or by briefly depressing the gas pedal. In a first specific embodiment, a warning may be output to the driver in the case where there is another obstacle between the vehicle and the other vehicle traveling ahead. In a further specific embodiment, the acceleration may be prevented even if it is initiated by the driver as long as there is another object in the travel path of vehicle 1.

In a further specific embodiment, the operating test not only checks whether ultrasonic sensors 3 are detecting the obstacle, but the signals received by ultrasonic sensors 3 are also analyzed. In a first specific embodiment, the distance measured by ultrasonic sensors 3 is compared to the distance measured by radar sensor 7. Proper operation of ultrasonic sensors 3 is established only if the distance measured by ultrasonic sensors 3 is in a predefined interval around the distance measured by radar sensor 7. A malfunction of ultrasonic sensors 3 is also established if this is not the case. In a further specific embodiment, alternatively or additionally, the amplitude of the reflected signal received by ultrasonic sensors 3 may also be analyzed. If the amplitude is less than a predefined value, the sensitivity of ultrasonic sensors 3 may be impaired. A malfunction of ultrasonic sensors 3 is also established in this case.

In another specific embodiment, the operating test is performed at least for all forward-looking sensors, at least in a central area of the front of vehicle 1. Proper operation of ultrasonic sensors 3 is only established if all forward-looking ultrasonic sensors detect an ultrasonic signal reflected by other vehicle 13 during the operating test. If at least one of the ultrasonic sensors is unable to receive the signal, a malfunction is established according to another embodiment, even if the vehicle is detected by one or more other sensors.

What is claimed is:

1. A distance measuring device for measuring a distance of a vehicle to an obstacle in a vehicle's surroundings, comprising:
   a first measuring system operating according to a first measuring method; and
   a second measuring system operating according to a second measuring method,
   wherein an operating test of the second measuring system takes place when the first measuring system detects an object in a short range, and
   wherein the operating test of the second measuring system is terminated with a positive result and proper operation of the second measuring system is established when the second measuring system also detects the object in a short range.

2. The distance measuring device according to claim 1, wherein the first measuring system is a measuring system having a long range and the second measuring system is a measuring system having a short range and a wide angular coverage.

3. The distance measuring device according to claim 1, wherein the first measuring system is a distance measuring system using electromagnetic signals and the second measuring system is a distance measuring system using sound signals.

4. The distance measuring device according to claim 3, wherein the electromagnetic signals are radar signals and the sound signals are ultrasonic signals.

5. The distance measuring device according to claim 1, wherein the device is used for controlling an automatic start of the vehicle, an automatic start taking place only if an operating test of the second measuring system has taken place and no obstacle is detected in front of the vehicle within a predefined distance by the first or second measuring systems.

6. A method for testing an operation of a system for measuring a distance to an obstacle in surroundings of a vehicle, the method comprising:
- detecting an obstacle in the vehicle's surroundings by a first and a second measuring system, the first and the second measuring systems determining the distance to the obstacle using different measuring methods;
- performing an operating test of the second measuring system when the first measuring system detects an object in a short range; and
- terminating the operating test with a positive result and establishing proper operation of the second measuring system when the second measuring system also detects the object in a short range.

7. The method according to claim 6, wherein the operating test is performed when or before the vehicle starts moving.

8. The method according to claim 6, wherein the first measuring system detects obstacles in a limited angular range in front of the vehicle via a radar measurement and the second measuring system detects obstacles within a predefined distance in a total angular range in front of the vehicle.

9. The method according to claim 6, wherein a functioning of the second measuring system is established when the distance measured by the second measuring system matches the distance measured by the first measuring system.

10. The method according to claim 6, wherein a measurement is performed before the vehicle starts moving.

* * * * *